(No Model.)
W. N. BELLAH.
WIRE TIGHTENER.
No. 432,221.  Patented July 15, 1890.
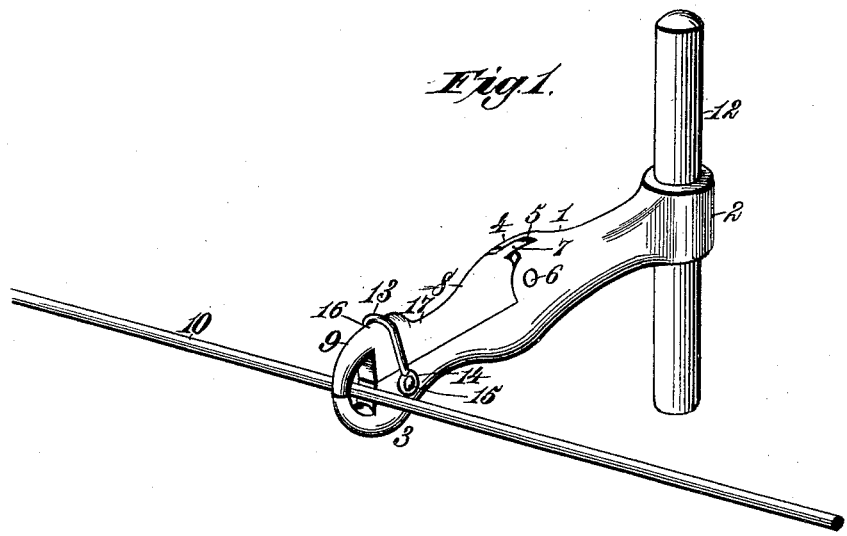
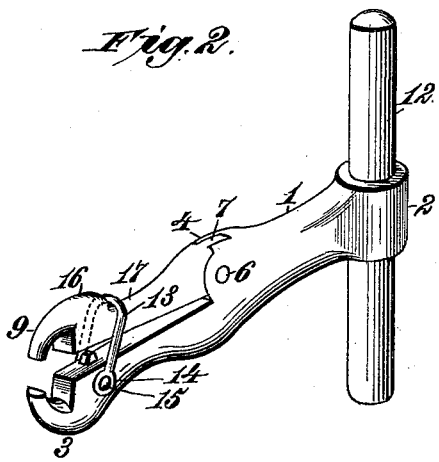
Witnesses:
Inventor:
William N. Bellah.
By
James L. Norris
Atty.

UNITED STATES PATENT OFFICE.

WILLIAM N. BELLAH, OF ST. JO, TEXAS, ASSIGNOR OF ONE-HALF TO JOHN D. BELLAH, OF SAME PLACE.

WIRE-TIGHTENER.

SPECIFICATION forming part of Letters Patent No. 432,221, dated July 15, 1890.

Application filed May 10, 1890. Serial No. 351,310. (No model.)

*To all whom it may concern:*

Be it known that I, WILLIAM N. BELLAH, a citizen of the United States, residing at St. Jo, in the county of Montague and State of Texas, have invented new and useful Improvements in Wire-Tighteners, of which the following is a specification.

This invention has for its objects to provide a novel, simple, economical, and efficient implement or tool for tightening wire fences by forming twists or loops in the fence-strands to take up the slack, and to provide a novel implement of this type wherein a rod or bar can be conveniently applied to increase the leverage in turning the implement to form the twists or loops. To accomplish these objects my invention involves the features of construction, the combination or arrangement of devices, and the principles of operation hereinafter described and claimed, reference being made to the accompanying drawings, in which—

Figure 1 is a perspective view of the improved device, showing it in position on a fence-strand preparatory to twisting the latter; and Fig. 2 is a perspective view of the device, showing the position of the parts when the pivoted arm is opened to engage a fence-strand.

In order to enable those skilled in the art to make and use my invention, I will now describe the same in detail, referring to the drawings, where—

The numeral 1 indicates a metallic shank having at one end a transverse socket 2, at the opposite end a hooked extension 3, and at or near the middle of its length a lateral offset or shoulder 4, in a recess 5 of which is secured by a transverse pivot 6 the tongue or tenon 7 on the inner end of a swinging arm 8, having at its outer end a hooked extension 9 of the same general shape and size as the hooked extension of the shank, whereby the points or extremities of the hooks may rest against each other and confine between them the strand 10 of a wire fence. A handle bar or rod 12 is engaged with the transverse socket 2 to secure proper leverage for turning the shank to twist the fence-strand and take up the slack therein. The handle bar or rod may be detachable and of wood; but this is not indispensable. The pivoted arm when closed, as in Fig. 1, rests squarely upon the rectilinear face of the shank, and to secure the arm down in this position I provide a locking device, consisting of a swinging yoke 13, having its two extremities formed into eyes 14, mounted on pivot-pins 15, fixed to the shank. The yoke embraces the shank and arm, and is adapted to engage or bear against a projection or head 16 on the arm to hold the latter rigidly in its closed position. To enable the yoke to release the arm and permit it to be opened slightly to separate the hooked extensions for engaging the fence-strand, the arm is recessed, as at 17, between its pivoted end and its projection or head 16, so that by swinging the yoke back, as in Fig. 2, sufficient space is provided for a limited outward movement of the pivoted arm. As the yoke is pivotally attached to the shank and at all times embraces the swinging arm, such yoke subserves the function of retaining the arm in proper position to engage the fence-wire.

The handles being made as a cross-bar on the shank enables the implement to be turned like an auger and provides for twisting the strands tightly to stretch the same with comparative ease and facility.

To tighten a loose wire, the implement is engaged therewith by its hooked extensions and the pivoted arm is locked by the yoke, as in Fig. 1, after which the device is rotated by the handle to twist the wire until it is sufficiently tightened.

Having thus described my invention, what I claim is—

1. A wire-tightener consisting of a shank having a lateral offset and an end extension to engage the wire, a swinging arm having one extremity pivoted to the offset and an extension at its opposite end, and a locking device for rigidly holding the arm upon the shank, substantially as described.

2. A wire-tightener consisting of a shank having a lateral offset and an end extension, a swinging arm pivoted at one end to the offset and having at the opposite end a wire-engaging extension, and a swinging yoke embracing the shank and arm and having its extremities pivoted to the shank, substantially as described.

3. A wire-tightener consisting of a shank having at one end a hook-extension, at the opposite end a handle-bar, and intermediate of the ends a lateral offset, a swinging arm pivoted at one end to the offset and having at the opposite end a hook-extension, and a locking device engaging the swinging arm between its pivoted end and its hooked extension, substantially as described.

4. A wire-tightener consisting of a shank having a lateral offset and a wire-engaging extension, a swinging arm pivoted at one end to the offset and having a wire-engaging extension at its opposite end and a recess between its ends, and a swinging yoke pivoted to the shank for locking and releasing the swinging arm, substantially as described.

In testimony whereof I have affixed my signature in presence of two witnesses.

WILLIAM N. BELLAH.

Witnesses:
T. S. MEADER,
J. W. BAILEY.